US 6,641,035 B1

(12) United States Patent
Predescu et al.

(10) Patent No.: US 6,641,035 B1
(45) Date of Patent: Nov. 4, 2003

(54) CARD MADE OF FLUORESCENT MATERIAL AND CARD READER FOR USE WITH THE CARD

(75) Inventors: Lucian Predescu, Chicago, IL (US); Hajime Oki, Arlington Heights, IL (US); Steve J. Lanovich, Evergreen Park, IL (US); Junichi Yamamoto, Elk Grove, IL (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 268 days.

(21) Appl. No.: 09/675,371

(22) Filed: Sep. 29, 2000

Related U.S. Application Data

(63) Continuation-in-part of application No. 09/637,989, filed on Aug. 11, 2000.

(51) Int. Cl.[7] .................................................. G06K 5/00
(52) U.S. Cl. .......................... 235/380; 235/382; 902/23
(58) Field of Search ............................... 235/491, 480, 235/380, 382; 283/85, 92; 902/23

(56) References Cited

U.S. PATENT DOCUMENTS

| | | | | |
|---|---|---|---|---|
| 3,614,430 A | * | 10/1971 | Berler | 250/271 |
| 3,723,655 A | * | 3/1973 | Zucker et al. | 235/468 |
| 4,138,195 A | | 2/1979 | Saurer et al. | |
| 5,005,873 A | * | 4/1991 | West | 235/491 |
| 5,635,696 A | | 6/1997 | Dabrowski | |
| 5,655,961 A | | 8/1997 | Acres et al. | |
| 5,702,304 A | | 12/1997 | Acres et al. | |
| 5,741,183 A | | 4/1998 | Acres et al. | |
| 5,752,882 A | | 5/1998 | Acres et al. | |
| 5,820,459 A | | 10/1998 | Acres et al. | |
| 5,836,817 A | | 11/1998 | Acres et al. | |
| 5,854,542 A | | 12/1998 | Forbes | |
| 5,876,284 A | | 3/1999 | Acres et al. | |
| 5,919,422 A | | 7/1999 | Yamanaka et al. | |
| 5,955,835 A | | 9/1999 | Oh et al. | |
| 5,959,281 A | * | 9/1999 | Domiteaux | 235/375 |
| 5,959,531 A | * | 9/1999 | Gallagher et al. | 340/531 |
| 6,008,784 A | | 12/1999 | Acres et al. | |
| 6,043,615 A | | 3/2000 | Forbes | |
| 6,047,966 A | | 4/2000 | Hishinuma et al. | |
| 6,115,557 A | * | 9/2000 | Maeda et al. | 358/909.1 |
| 6,162,122 A | | 12/2000 | Acres et al. | |
| 6,203,853 B1 | | 3/2001 | Takamatsu et al. | |
| 6,268,058 B1 | * | 7/2001 | Tahon et al. | 369/283 |
| 6,280,797 B1 | | 8/2001 | Kuczynski et al. | |
| 6,296,188 B1 | * | 10/2001 | Kiekhaefer | 235/487 |

FOREIGN PATENT DOCUMENTS

| | | |
|---|---|---|
| JP | 09-114945 | 5/1997 |
| JP | 11-144014 | 5/1999 |
| JP | 2000-172793 | 6/2000 |

* cited by examiner

*Primary Examiner*—Michael G. Lee
*Assistant Examiner*—Kimberly Nguyen
(74) *Attorney, Agent, or Firm*—Brinks Hofer Gilson & Lione

(57) ABSTRACT

A card that carries information on it and a card reader that read and/or writes information on the card. The card is made of a fluorescent material that, when receiving UV light, emits light in the visible spectrum. The card reader may have a UV lamp for illuminating the card. The card, illuminated by the UV lamp, glows at a desired state of the card read/write operation. If the card reader is a contactless reader, the reader will irradiate UV light to the card brought in close proximity to the reader. Illuminated by the UV light, the card glows in the hand of a cardholder.

20 Claims, 6 Drawing Sheets

US 6,641,035 B1

CARD MADE OF FLUORESCENT MATERIAL AND CARD READER FOR USE WITH THE CARD

CROSS-REFERENCE TO RELATED APPLICATION

This application is a continuation in part of application Ser. No. 09/637,989 filed on Aug. 11, 2000 by the same Applicants.

BACKGROUND OF THE INVENTION

This invention relates to a card made of a fluorescent material and a card reader for use with the card, and more specifically to a card that illuminates or glows in connection with the card reading/writing operation by the card reader.

In these days, casinos are highly computerized. Gaming machines are connected to a host computer that monitors the usage of each gaming machine. Gaming tables and gaming machines are provided with card readers. Players are given an identification card encoded with an identification code unique to each of the players. Before playing a game, the player inserts the card into the card reader that is provided for the gaming machine the player is about to play or the card reader that is provided in front of the player's seat at a gaming table.

Advantages of providing card readers for game tables and gaming machines are apparent. The identification code read by the card reader is sent from the gaming machine or table to the host computer, along with data indicating the player's gaming activities, such as the amount of money the player spent and the games the player played. The host computer tracks the player's gaming activities and makes a report that enables the casino to provide more individualized services to the player.

The identification cards and card readers may eliminate the need to bring around cash, coins or tokens inside casinos. Players may pay in advance for game plays. The amount of money the player paid is recorded on the player's account on the host computer. At each game play, the amount won is credited and the amount lost is debited on the player's account. Thus, the identification cards and card readers allow players to enjoy games without using cash, coins or tokens.

Furthermore, although subject to regulatory approval, the player can enjoy games even without bothering to pay in advance, using the player's credit card. The player's credit card information is read by the card reader and sent to the host computer. At each game play, the host computer settles a transaction directly on the player's credit card account.

Today, casinos are spending more money in light displays and light demonstrations than ever before in attempts to entertain and attract customers. In fact, colorful flickering running lights flourish on floors of casinos. Under the circumstances, a desire naturally arises in the mind of people that they wish to have even identification cards used in casinos visually pleasing and attractive. As discussed above, data collected through card readers can improve casinos' services and players' conveniences. Casinos have therefore been promoting the use of identification cards by customers. Visually pleasing and attractive identification cards are expected to win more customer acceptance.

BRIEF SUMMARY OF THE INVENTION

It is therefore the purpose of the invention to provide an identification card that is visually pleasing and attractive and can promote customer acceptance of the card. To this end, an identification card according to the present invention is made of a fluorescent material that has the characteristics of glowing when receiving UV light. A card reader may be provided with a UV lamp that illuminates the identification card at a desired stage of the card reading/writing operation, such as an insertion of the card into the card reader, reading of the identification code recorded on the card or verification of the identification code. According to the present invention, the card glows without any battery therein.

DETAILED DESCRIPTION OF THE INVENTION

Figure 1:
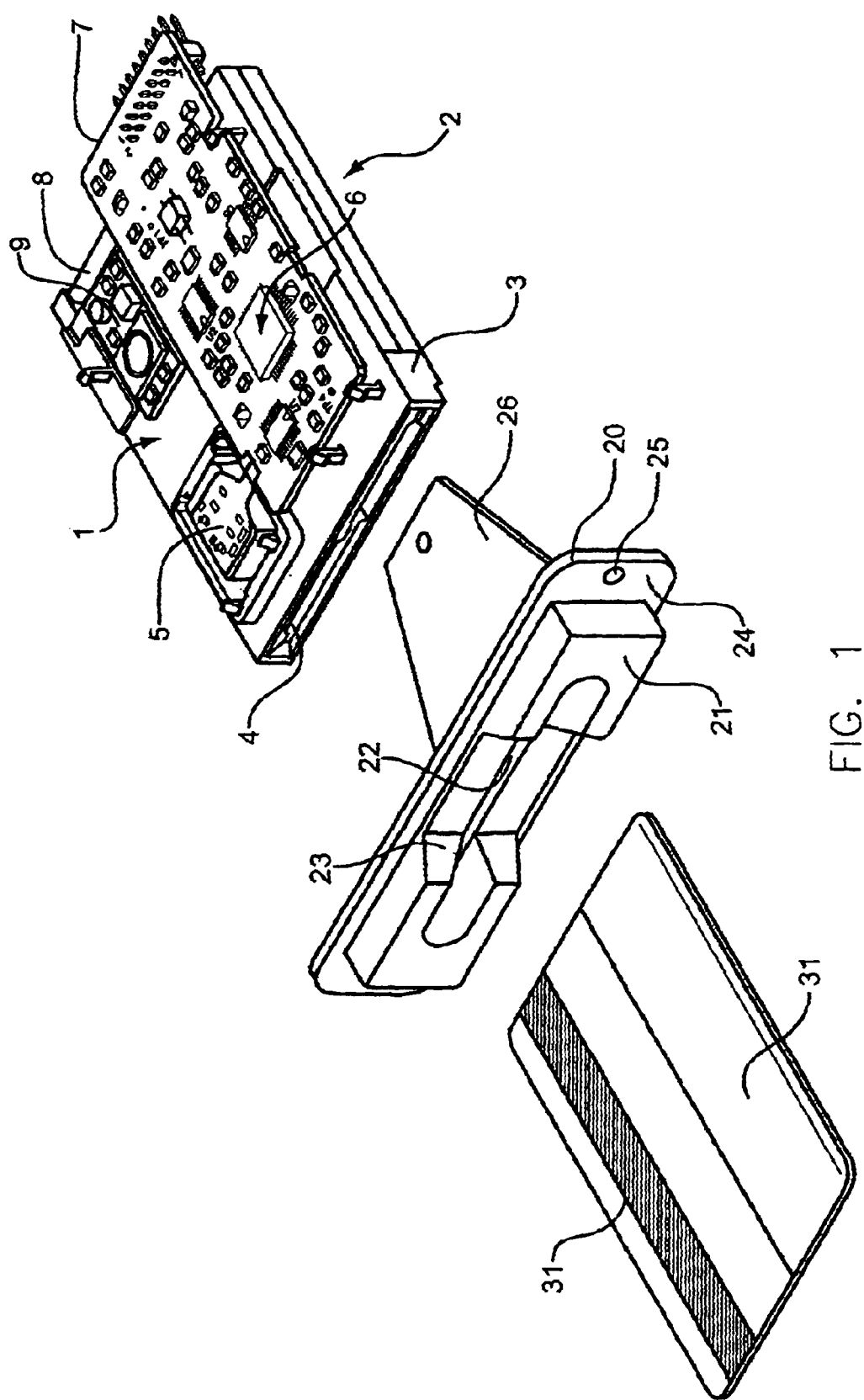
FIG. 1 is a perspective view showing a card and a card reader of an embodiment according to the present invention.

FIG. 1 shows a card and a card reader of an embodiment according to the present invention. As shown in FIG. 1, a card reader 1 according to the present invention includes a card read/write device 2 and a bezel 20. The card read/write device 2 includes a flat rectangular casing 3. The casing 3 of the card read/write device 2 has in its front surface a slot 4 through which a card 30 is insertable into the casing 3. The card read/write device 2 has a magnetic head 5 for reading and writing data along a magnetic strip 31 formed on the rear surface of the card 30, and a control circuit 6 for controlling the card reader 1. The magnetic head 5 is positioned on the top surface of the casing 3 near the slot 4 at a location corresponding to the lateral position of the magnetic strip 31 on the card 30. The control circuit 6 is mounted on a circuit board 7 assembled on the top surface of the casing 3.

The bezel 20 is made of a molded plastic that is black and opaque, and secured to the front end of the casing 3. As shown in FIG. 1, the bezel 20 has a rectangular elevated portion 21 on its face. An elongated window 22 is formed in the elevated portion 21 along its length. Through the elongated window 22, the card 30 is insertable into the slot 4 of the card read/write device 2. A recess 23 is formed in the elevated portion 21 to provide finger access to the card 30 during insertion of the card 30 into the card reader 1 and removal of the card 30 from the card reader 1. The bezel 20 is formed with a flange 24 having a pair of screw holes 25 in both ends. The bezel 20 is also formed with a trapezoidal rear structure 26 that is fixed to the bottom surface of the casing 3 with a couple of screws, thereby securing the bezel 20 to the casing 3 (see FIGS. 3 and 4).

The card reader 1 is installed inside a gaming machine, such as a slot machine in a casino. The front panel of the gaming machine is formed with a rectangular window of a size little larger than the elevated portion 21 of the bezel 20. The card reader 1 is attached to the interior of the front panel in such a manner that the elevated portion 21 projects outside of the gaming machine through the rectangular window formed in the front panel. The bezel 20 is secured to the front panel of the gaming machine by means of two screws going through the screw holes 25. After installed inside the gaming machine, only the elevated portion 21 is visible from the outside of the gaming machine.

Figure 2:
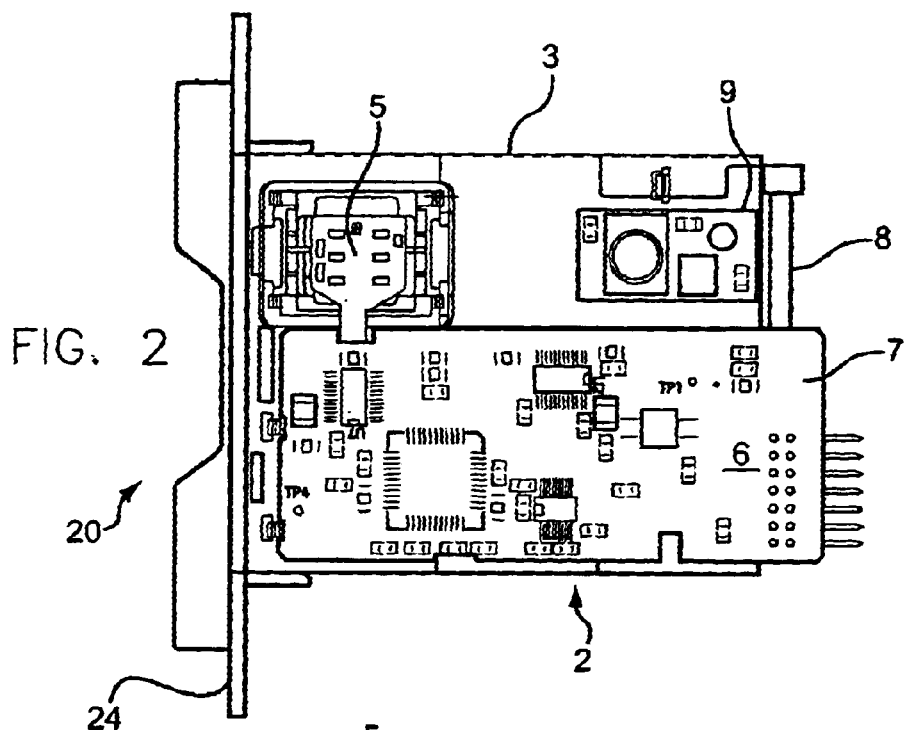
FIG. 2 is a top view showing the card reader shown in FIG. 1.
Figure 3:
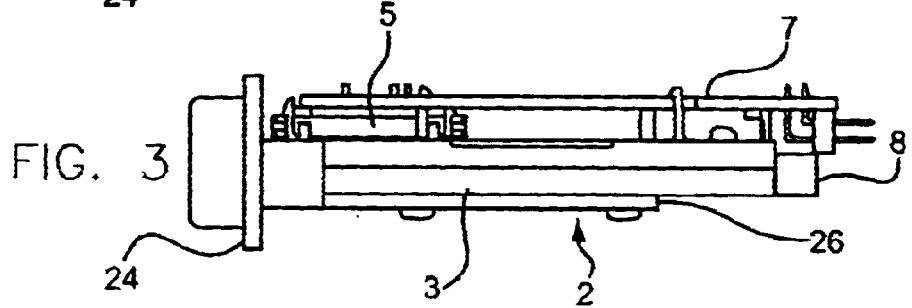
FIG. 3 is a side view showing the same card reader.
Figure 4:
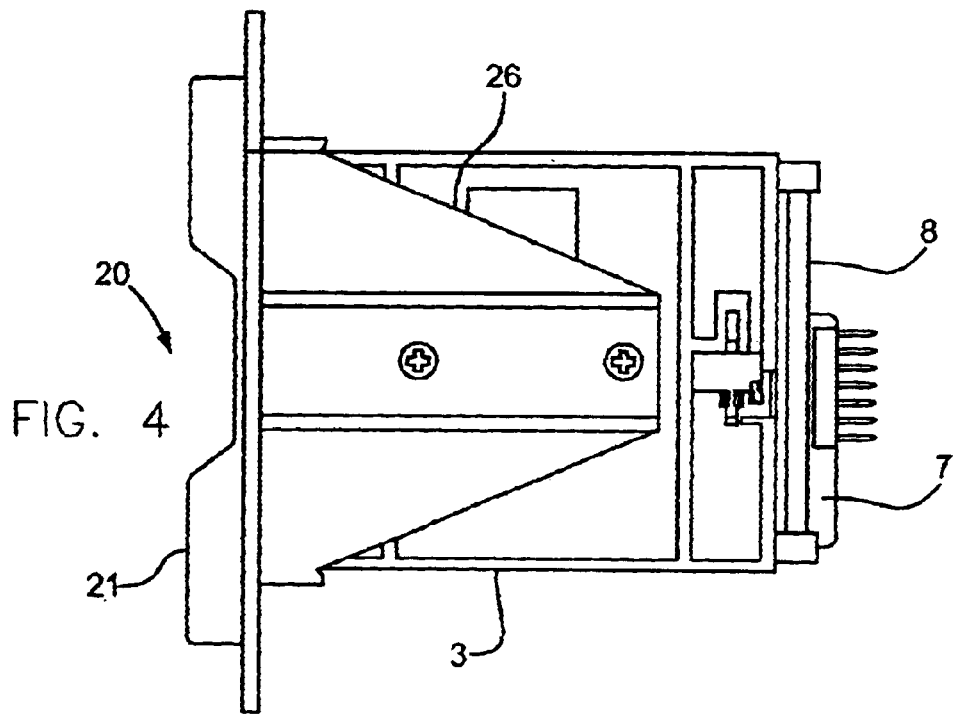
FIG. 4 is a bottom view showing the same card reader.

The card reader 1 shown in FIG. 1 is illustrated in more detail in FIGS. 2, 3 and 4. Unlike conventional card readers, the card reader 1 has a UV lamp 8 and a UV lamp inverter 9. Also, the casing 3 is made of a transparent plastic so that UV light from the UV lamp 8 goes through it. The UV lamp 8 is of a cylindrical shape substantially equal in length to the width of the casing 3, and attached in parallel to the rear surface of the casing 3. The UV lamp inverter 9 is mounted on the top surface of the casing 3 and generates sufficiently high voltage to drive the UV lamp 8 to illuminate. Such a UV lamp and an inverter are commercially available from JKL Components Corporation, Pacoima, Calif. Please note that the UV lamp 8 may take any shape and have any length as long as it can serve the purposes of the present invention.

Figure 5:
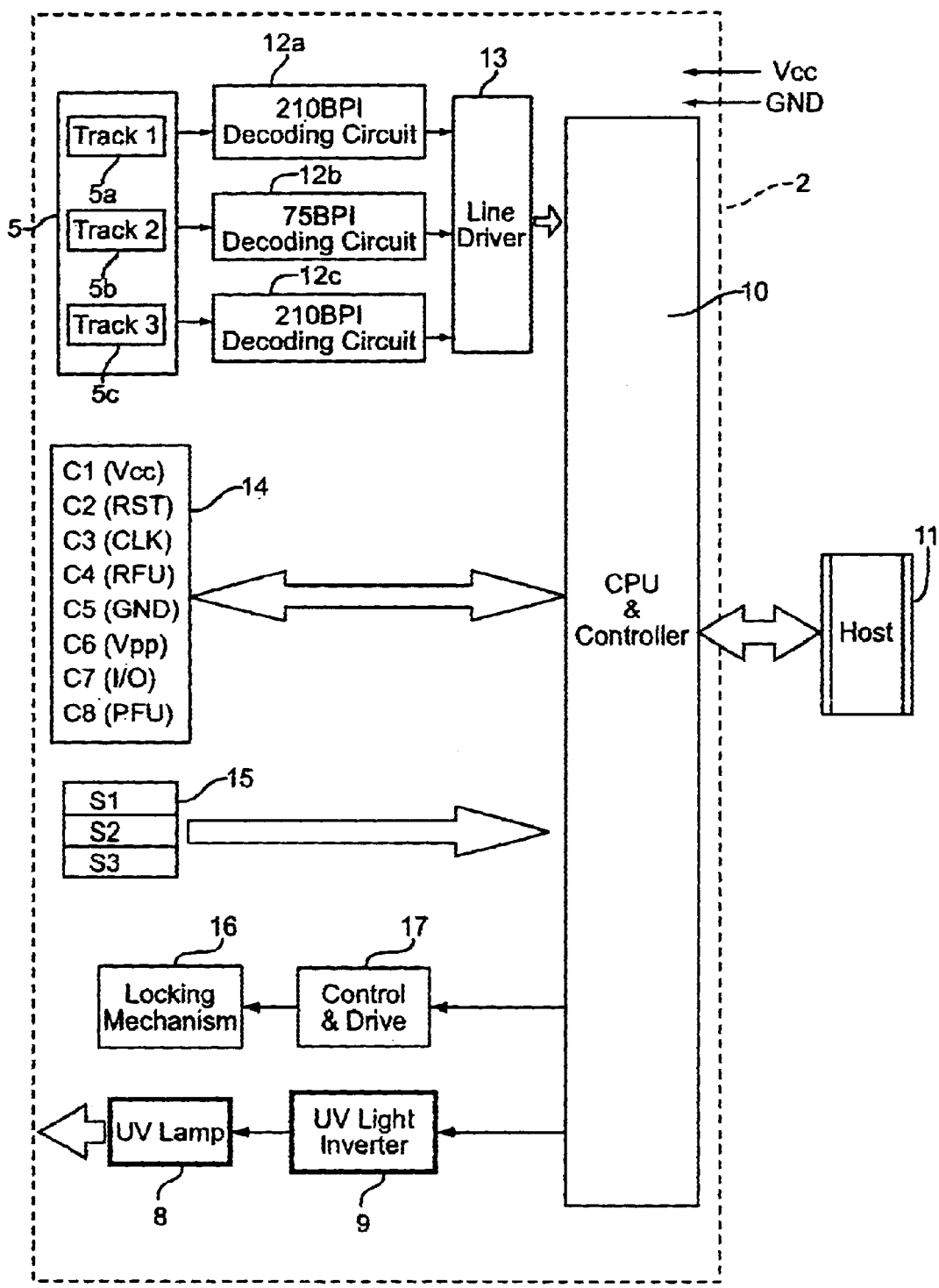
FIG. 5 is a block diagram showing a card read/write device of the card reader shown in FIG. 1.

FIG. 5 shows a block diagram of the card read/write device 2. The card read/write device 2 has a CPU 10 that controls functions and operations of the electronic and mechanical components of the card read/write device 2. The CPU 10 also control communications with a host computer 11.

The card read/write device 2 is capable of reading and writing data on various kinds of cards. For instance, the card may be an ordinary magnetic card with a magnetic strip along which data is recorded magnetically, or an IC card that stores data electronically. The card may also be a combination of IC and magnetic cards, which is called a hybrid card. Ordinarily, a magnetic strip on a magnetic card has three tracks 1, 2 and 3, corresponding respectively to which the magnetic head 5 has three heads 5a, 5b and 5c. The recoding densities of these tracks may differ from one another and are usually determined at the request of a customer who is to use the card reader 1. In this embodiment, the recording densities of the tracks 1, 2 and 3 are set at 210 bits per inch (BPI), 75 BPI and 210 BPI, respectively. Data recorded on the tracks 1, 2 and 3 is retrieved by the corresponding heads of the magnetic head 5 and supplied to the CPU 10 through corresponding decoding circuitries 12a, 12b and 12c and a line driver 13. The card read/write device 2 is also equipped with IC card contacts collectively indicated by reference number 14. Those contacts 14 are located in the center of the bottom surface of the casing 3. Through these contacts 14, the CPU 10 reads and writes data on the IC card.

The card read/write device 2 is capable of reading and writing data on various kinds of cards. For instance, the card may be an ordinary magnetic card with a magnetic strip along which data is recorded magnetically, or an IC card that stores data electronically. The card may also be a combination of IC and magnetic cards, which is called a hybrid card. Ordinarily, a magnetic strip on a magnetic card has three tracks 1, 2 and 3, corresponding respectively to which the magnetic head 5 has three heads 5a, 5b and 5c. The recording densities of these tracks may differ from one another and are usually determined at the request of a customer who is to use the card reader 1. In this embodiment, the recording densities of the tracks 1, 2 and 3 are set at 210 bits per inch (BPI), 75 BPI and 210 BPI, respectively. Data recorded on the tracks 1, 2 and 3 is retrieved by the corresponding heads of the magnetic head 5 and supplied to the CPU 10 through corresponding decoding circuitries 12a, 12b and 12c and a line driver 13. The card read/write device 2 is also equipped with IC card contacts collectively indicated by reference number 14. Those contacts 14 are located in the center of the bottom surface of the casing 3. Through these contacts 14, the CPU 10 reads and writes data on the IC card.

Turning back to FIG. 1, the card 30 is made of a fluorescent plastic having the characteristic of absorbing UV light and emitting bright light in the visible spectrum. The card is made either transparent or half opaque. Due to this characteristic of the fluorescent plastic, the card 30 emits light when illuminated by the UV lamp 8. Such a fluorescent plastic is commercially available from LNP Engineering Plastics, Inc., Thorndale, Pa.

When the gaming machine is turned on, power is supplied to the card reader 1, and the CPU 10 turns on the UV lamp 8. UV light from the UV lamp 8 is not visible but goes through the transparent casing 3 and goes out from the elongated window 22 of the elevated portion 21 projecting outside the gaming machine. When the player who wishes to play the gaming machine brings the card 30 close to the bezel 20 projecting outside the gaming machine, the card 30, receiving the UV light leaking from the elongated window 22, softly glows under a dimly lit light condition in the casino and aids the player in locating the elongated window 22 and inserting the card 30 into it. As the player inserts the card 30 into the card reader 1, the card 30 receives more UV light from the UV lamp 8 and becomes progressively brighter. The change in the brightness of the card 30 should look amusing to the player. When the card 30 is fully inserted in the card reader 1, the card 30 glows intensively and emits light outside from the elongated window 22, thereby making the elongated window 22 and thus the bezel 20 look entertaining.

When the player inserts the card 30 into the card reader 1, the magnetic head 5, if the card is a magnetic card, or the IC card contacts 14, if the card is an IC card, reads an identification code recorded on the card 30 and sends it to the CPU 10. The CPU 10 then communicates the identification code to the host computer 11. This identification code allows the host computer 11 to track the cardholder's gaming activities. More specifically, the host computer 11 has a personal account for the player maintained in relation to the identification code, and all transactions of the player with the gaming machine will be settled on the personal account maintained on the host computer 11. Thus, at each game play, the gaming machine sends the host computer 11 information on the amount the player won or lost. The host computer 11 then credits or debits the amount on the personal account maintained thereon. If the card is an IC card, the transactions may be recorded on the card itself.

Figure 6:
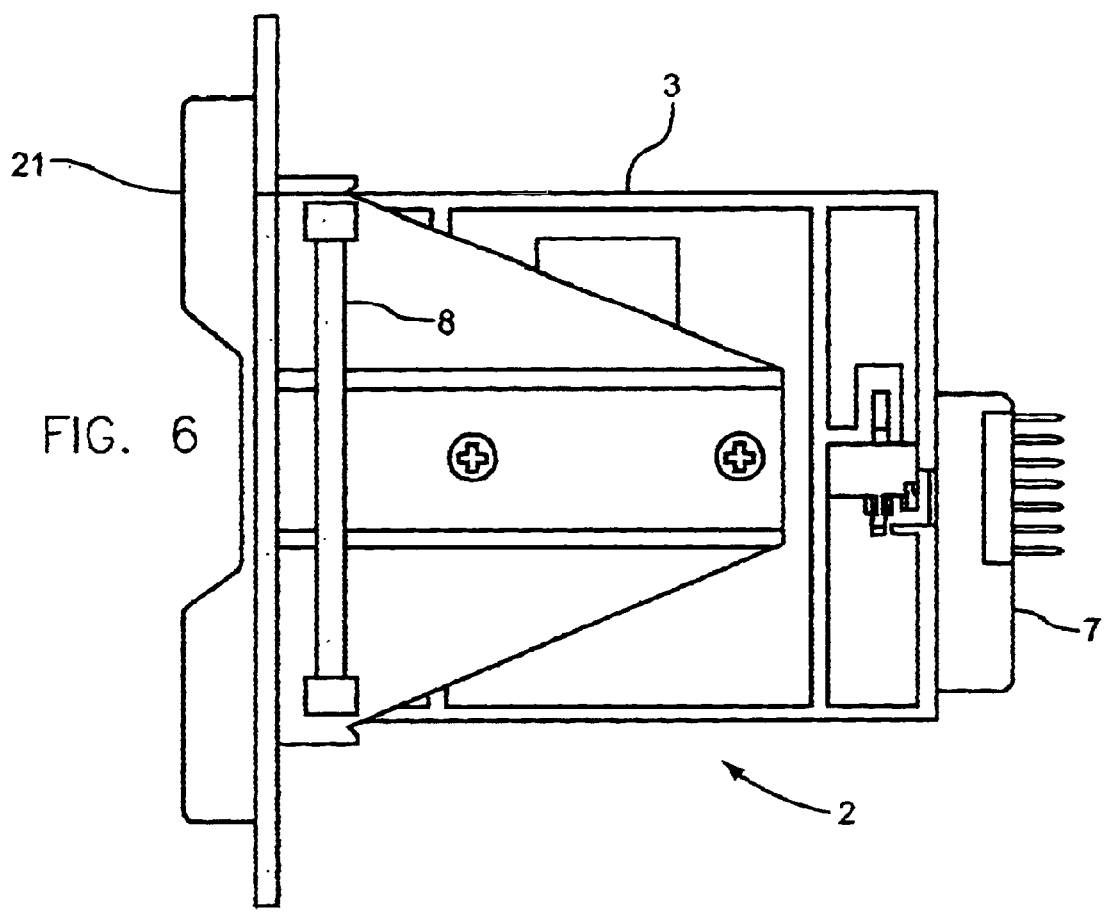
FIG. 6 is a bottom view showing a card reader of another embodiment according to the present invention.

In the embodiment described above, the UV lamp 8 is placed at the rear surface of the read/write device 2. It will be appreciated that the UV lamp 8 may be positioned at a different location than shown in FIGS. 2, 3 and 4. For instance, the UV lamp 8 may be positioned near the bezel 20 on the bottom surface of the casing 3 as shown in FIG. 6. To let the UV light from the UV lamp 8 go out of the gaming machine, at least the rear structure 26 of the bezel 20 is made transparent. Alternatively, the UV lamp 8 may be placed inside casing 3 to illuminate the interior of the casing 3. If the UV lamp 8 is placed inside the casing 3, the casing 3 may be made of an opaque plastic.

The card 30 may be colored so that it can emit visually attractive light. DAY-GLO Color Corporation, Cleveland, Ohio, specializes in coloring the fluorescent plastics. The fluorescent plastic colored by DAY-GLO Color Corporation is also available from LNP Engineering Plastics, Inc, under the name of "Colorcomp D-1000." According to the experiments Applicants conducted, the colors that make the card 30 visually attractive are yellow, whose product identification numbers are "YL3-559 FL TP" and "YL3-563 FL TP"; red (RD1-211-1 FL TP); and blue (BL5-625-1 FL TP). Players may be given cards with different colors according to their customer statuses at a casino similarly to credit cards, whose classifications, such as silver, gold, platinum, etc., indicate customer statutes. If a casino room is lit up by a black light or UV light, the card 30 absorbs the UV light in the casino room and glows with its color when the player takes out the card 30 from a pocket or a card case. The color of the light emitted from the card 30 will enable casino personnel to visually recognize the player's customer status and provide services to the player accordingly. The black light in a casino room may not be necessary. The fluorescent plastic has a characteristic of collecting ambient light and re-emitting it at the edges with high intensity. Thus, the card 30, without being illuminated by the black light, collects light from a dimly lit ambience inside a casino and softly glows.

The bezel 20 may also be made of the fluorescent plastic but having a color different from that of the card 30. If the bezel 20 is so made, the bezel 20 and the card 30 inserted in the card read/write device 2 emit light in the mixed colors that make the bezel 20 look aesthetically pleasing. The card 30 may be molded of a plurality of fluorescent plastics of different colors to impart visually pleasing coloration to the card 30.

In accordance with instructions from the host computer 11, the CPU 10 may turn the UV lamp 8 on and off, changing the intensity of the light, the pulse duration and the pulse repetition rate, so that the card 30 inserted in the card read/write device 2 will emit visually amusing patterns of light. For instance, when the player wins a significant amount of money, the host computer 11 may instruct the CPU 10 to turn on and off the UV lamp 8 in such a pattern as to celebrate the big win. When the player is losing money, the host computer 11 may instruct the CPU 10 to turn on and off the UV lamp 8 in such a pattern as to cheer up the player. The UV lamp 8 may be turned on and off in predetermined patterns to convey to the player information indicating, for instance, an amount left on the player's account.

In the above embodiment, the UV lamp 8 is basically turned on when power is supplied to the card reader 1 and turned off when power supply to the card reader 1 is shut off. But the UV lamp may be turned on and off at a desired stage of the card reading/writing operation by the card reader 1. For instance, the UV lamp 8 may be turned on when one of the card-detecting sensors 15, such as the fully insertion sensor, detects the presence of the card 30 inside the card read/write device 2. The UV lamp 8 may be turned on when the CPU 10 successfully reads out the data recorded on the card 30. Alternatively, the UV lamp 8 may be turned on when the CPU 10 receives from the host computer 11 a signal indicating, for instance, that the host computer 11 has successfully verified the identification code supplied from the card reader 1. The UV lamp 8 that has been turned on in any of the above-described ways may be turned off, for instance, when the card 30 is removed from the card reader 1, or all of the card-detecting sensors 15 are turned off.

The card 30 may be made of a fluorescent plastic having a special characteristic. For instance, a special fluorescent plastic is known that has the characteristic of storing light in a bright light condition and emits the stored light in the dark. Such a special plastic is commercially available under the name of "Lumi Nova (N Yako G300 series)" from Nemoto Tokushu Kagaku K.K.

In the above embodiments, the card 30 used with the card reader 1 is an ordinary magnetic card, an IC card, or a hybrid card. Generally, cards may be classified according to their physical recording characteristics, for instance, a magnetic card or an IC card, or according to their financial characteristics, for instance, a credit card or a debit card. One of ordinary skill in the art will appreciate that regardless of how they are classified, the present invention is applicable to any kinds of cards, such as a smart card, a credit card or a debit card, or a combination of any of these cards.

Also, in the above embodiments, the card reader 1 is attached to a gaming machine, such as a slot machine. But one of ordinary skill in the art will appreciate that a gaming machine to which the card reader 1 can be attached is not limited to a slot machine. The gaming machine can be any type of gaming machine, such as a pachinko machine.

Figure 7:
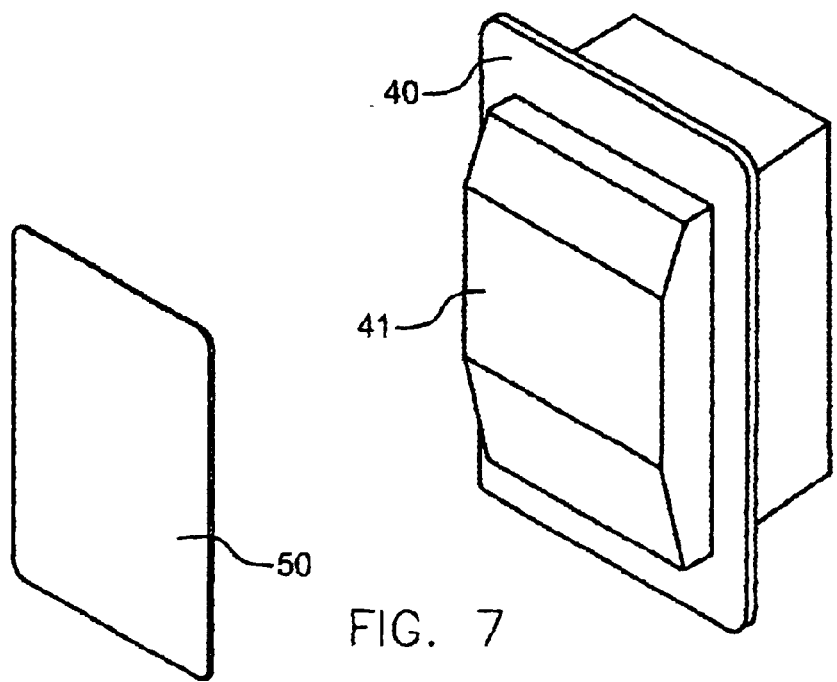
FIG. 7 is a perspective view showing a card and a card reader of another embodiment according to the present invention.

FIG. 7 shows another embodiment of the present invention in which the present invention is applied to a RF contactless card reader or proximity card reader. A contactless card reader is a card reader that can read information on a card without physically contacting the card when the card is brought in close proximity to the card reader. In FIG. 7, a contactless card reader 40 according to the present invention reads data recorded on a card 50 that is placed in close proximity to the reader 40. The reader 40 has a cover 41 made of a material that allows UV light to pass through it. If the reader 40 is used with a gaming machine, the reader 40 is installed inside the gaming machine so that the cover 41 is visible from the outside the gaming machine. If the reader 40 is used for other purposes, such as for the security purpose, the reader 40 is placed in a wall near the locked door to be opened, making the cover 41 visible.

Figure 8:
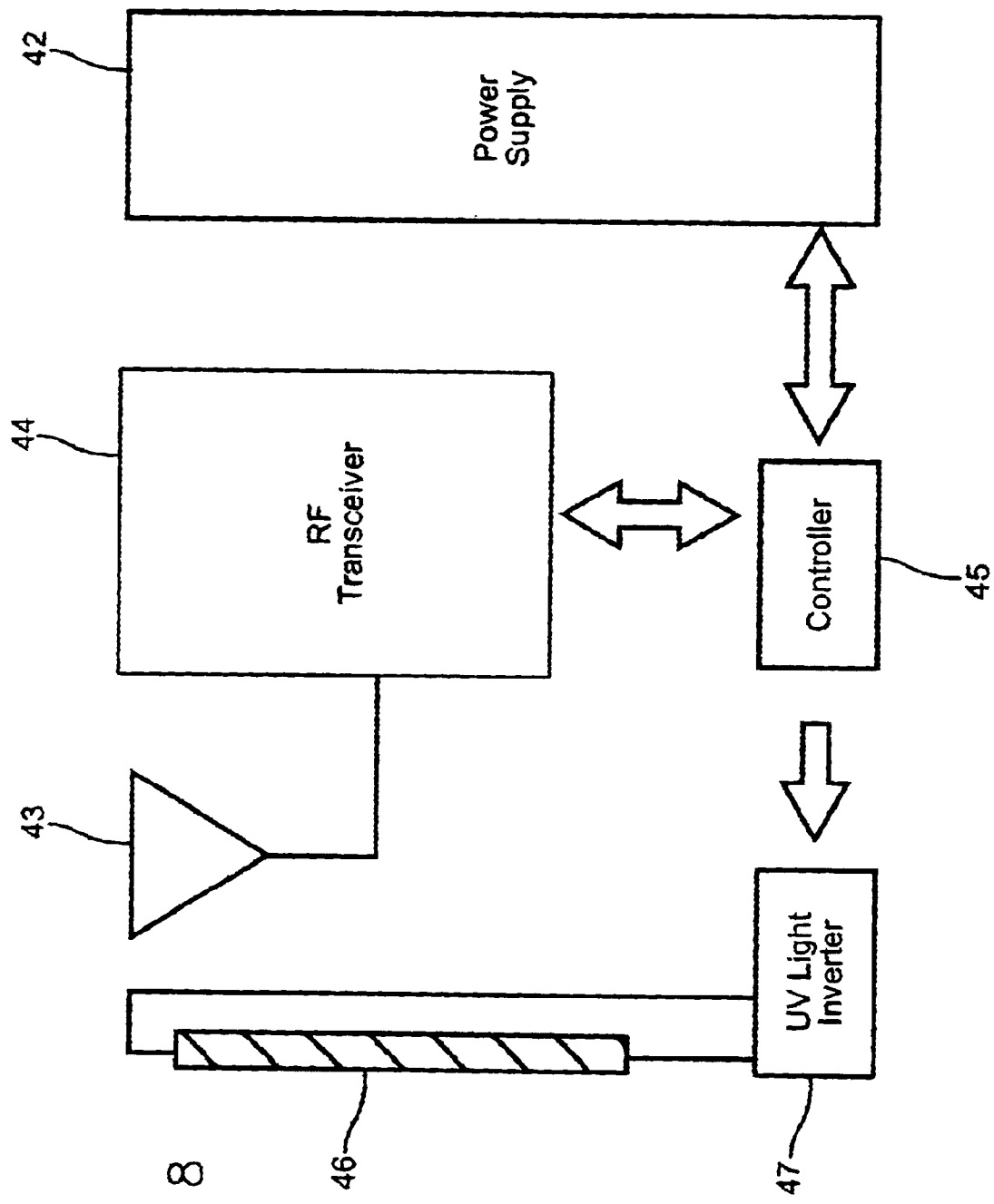
FIG. 8 is a block diagram showing the card reader shown in FIG. 7.

FIG. 8 is a block diagram showing the RF contactless reader 1. The reader 1 has a power supply 42. The reader 40 also has an antenna 43 that transmits an interrogation signal through a RF transceiver 44 under the control of a controller 45. The antenna 43 also functions to receive a response signal from the card 50 and supply the signal to the controller 45 through the RF transceiver 44. The controller 45 turns on and off a UV lamp 46 through a UV lamp inverter 47.

Figure 9:
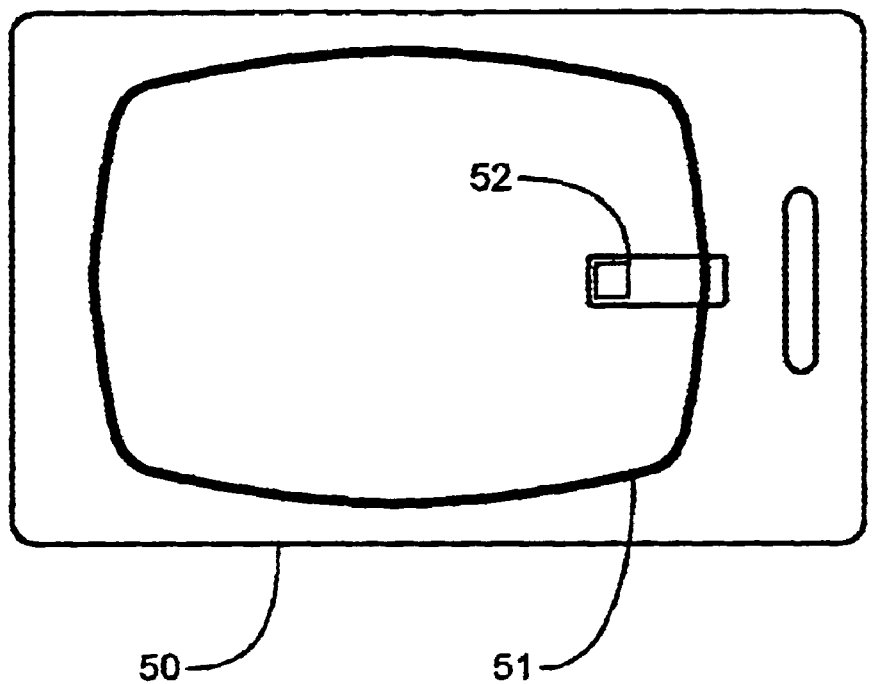
FIG. 9 is a view showing the inside of the card shown in FIG. 7.

FIG. 9 is a view showing the inside of the card 50. The card 50 is made of the same fluorescent material as used for the above-embodiments that has the characteristic of absorbing UV light and emitting bright light in the visible spectrum. An antenna 51 and a microchip 52 are embedded in the card 50. The antenna 51 receives the interrogation signal from the reader 40, and electrical current is induced in the antenna 51 that turns on the microchip 52. Turned on by the electrical current supplied from the antenna 51, the microchip 52 reads out an identification code recorded therein and transmits the identification code to the reader 40 through the antenna 51.

The contactless card reader 40 transmits the interrogation signal from the antenna 43. If the card 50 is brought in proximity close enough for the antenna 51 to receive the interrogation signal with sufficient electromagnetic energy, electrical current induced in the antenna 51 of the card 50 turns on the microchip 52. The microchip 52 then reads out the identification code recorded therein and transmits it through the antenna 51. The reader 40 receives the response signal from the card 50 through the antenna 43 and the RF transceiver 44. The controller 45 verifies the received response signal from the card 50. If the identification code is successfully verified, the controller 45 turns on the UV lamp 46 for a moment. The UV light from the UV lamp 46 goes out through the cover 41 of the card reader 40. Upon reception of the UV light from the UV lamp 46, the card 50 glows momentarily, thereby advising the cardholder that the card 50 has been successfully read and verified. Conventionally, the contactless card reader returns an acoustic signal, such as a sound of buzzer, to advise the cardholder that the card has been successfully read. But a sound of buzzer is not helpful at all to a cardholder who has a hearing problem. Some conventional contactless card readers have an LED that flashes when the card is successfully read. The LED may give some help to a cardholder who has a hearing problem. But in the present invention, the card itself glows in the hand of the cardholder, thereby catching more attention of the cardholder than the small LED on the conventional contactless card readers.

Figure 10:
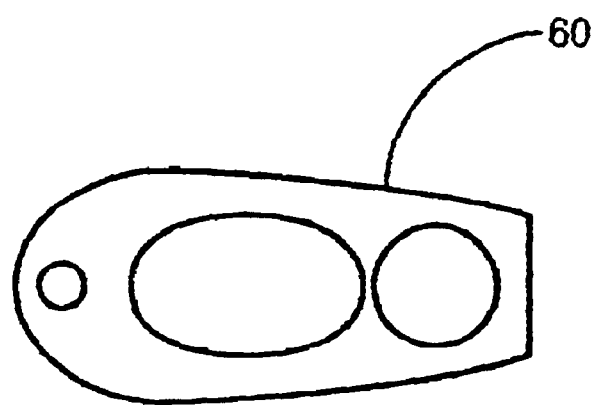
FIG. 10 is a perspective view showing a key fob according to another embodiment of the present invention.

FIG. 10 shows a key fob 60 used with the contactless reader 40. The key fob 60, like the card 50, includes an antenna and a microchip inside. It is made of the fluorescent material and glows when it receives UV light from the reader 40.

Although the present invention has been described with reference to particular illustrative embodiments thereof, many changes and modifications of the invention may become apparent to those skilled in the art without departing from the spirit and scope of the invention.

What is claimed is:

1. A combination of a card carrying information and a card reader for reading and writing information on the card, the card being made of a fluorescent material that, when receiving UV light, emits light in a visible spectrum, and the card reader including a UV lamp and being made at least in part of a material that allows UV light from the UV lamp to pass through the material and go out of the card reader so as to illuminate the card placed adjacent to the card reader.

2. A combination according to claim 1, wherein the card is colored in a desired color.

3. A combination according to claim 1, wherein the card is made of a plurality of fluorescent materials of different colors to emit light in desired coloration.

4. A combination according to claim 1, wherein the card is selected from the group consisting of a magnetic card, IC card, smart card, credit card, and debit card.

5. A combination according to claim 1, wherein the card is a contactless card used with a RF contactless reader.

6. A combination according to claim 1, wherein the UV lamp is always turned on.

7. A combination according to claim 1, wherein the card reader has at least one sensor for detecting the card, and the UV lamp is turned on when the at least one sensor detects the card.

8. A combination according to claim 1, wherein the UV lamp is turned on when the information on the card is verified.

9. A combination according to claim 1, wherein the card reader turns on and off the UV lamp so that the card will emit desired patterns of light.

10. A combination of a card carrying information and a card reader for reading and writing information on the card, the card being made of a fluorescent material that, when receiving UV light, emits light in a visible spectrum, and the card reader including a UV lamp and a casing with a slot through which the card is inserted, wherein UV light from the UV lamp goes out of the card reader through the slot to illuminate the card placed adjacent to the card reader.

11. A combination according to claim 10, wherein the card is colored in a desired color.

12. A combination according to claim 10, wherein the card is made of a plurality of fluorescent materials of different colors to emit light in desired coloration.

13. A combination according to claim 10, wherein the card is selected from the group consisting of a magnetic card, IC card, smart card, credit card, and debit card.

14. A combination according to claim 10, wherein the UV lamp is provided outside the casing, and the casing is made transparent.

15. A combination according to claim 10, wherein the UV lamp is provided inside the casing.

16. A combination according to claim 10, wherein the card reader has a bezel attached at the slot, the card being colored, the bezel being made of the fluorescent material of a color different from the color of the card.

17. A combination according to claim 10, wherein the UV lamp is always turned on.

18. A combination according to claim 10, wherein the card reader has at least one sensor for detecting the card, and the UV lamp is turned on when the at least one sensor detects the card.

19. A combination according to claim 10, wherein the UV lamp is turned on when the information on the card is verified.

20. A combination according to claim 10, wherein the card reader turns on and off the UV lamp so that the card will emit desired patterns of light.

* * * * *